June 26, 1951  H. H. STYLL  2,558,500

OPHTHALMIC MOUNTING

Filed April 3, 1947

INVENTOR.
HARRY H. STYLL.
BY
Louis L. Gagnon
ATTORNEY

Patented June 26, 1951

2,558,500

UNITED STATES PATENT OFFICE 2,558,500

OPHTHALMIC MOUNTING

Harry H. Styll, Southbridge, Mass., assignor to American Optical Company, Southbridge, Mass., a voluntary association of Massachusetts Application April 3, 1947, Serial No. 739,078

2 Claims. (Cl. 88—41)

This invention relates to improvements in ophthalmic mountings.

One of the principal objects of the invention is to provide a new and improved ophthalmic mounting or spectacle frame.

Another object of the invention is to provide an improved lens rim and temple connection for an ophthalmic mounting.

Another object of the invention is to provide improved means for removing the strain from the temple side lens connections of an ophthalmic mounting.

Another object of the invention is to provide simple, efficient and economical means for removing the temple strains from the temple side lens connections of an ophthalmic mounting.

Other objects and advantages of the invention will become apparent from the following description taken in conjunction with the accompanying drawings. It will be apparent that many changes in the details of construction, the arrangement of parts and in the steps of the processes may be made without departing from the invention as set forth in the accompanying claims. The preferred arrangements and matters have been set forth by way of illustration only.

One important form of ophthalmic mounting is the semi-rimless form in which the lens rim is confined to substantially the top contour of the lens edges, the lower parts of the lens edges being rimless. In the prior art difficulty has been met with in that the temple connection to the rims on the temple sides of the lenses has caused heavy strains on the temple side lens connections and consequent breakage of the lenses at the points of attachment of the temple side lens connections. The temples being long and where pivoted adjacent the temple side lens connections as in the prior art bring about great leverages and strains on the lenses at said lens connections with liability of lens breakage at said connections. It is a principal object of the invention to provide means by which these strains are removed without in any way interfering with the securing and holding of the lenses by the lens holding means.

Referring to the drawings.

Referring to the drawings wherein similar reference characters denote corresponding parts throughout.

The lenses 1 are held and secured in place by the lens straps or connections 2 associated with the lens rims 5. The lenses are held in spaced aligned position by the central bridge portion 6 associated with the rims adjacent the lens straps on the nasal sides of the lenses.

Figure 1:
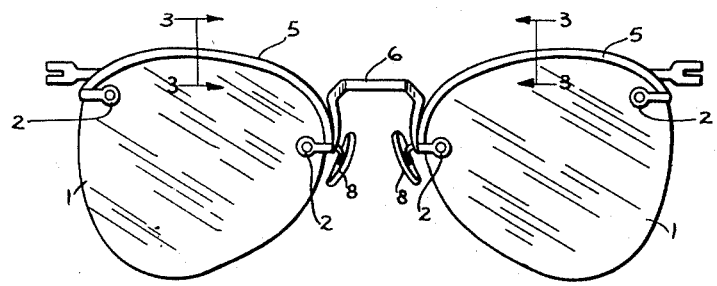
Fig. 1 is a front view of an ophthalmic mounting embodying the invention.

In Fig. 1 the lens rims 5 are shown extending only along the tops of the lenses from the temple side lens connection adjacent the top temple side portions of the lenses to the nasal side lens connections adjacent the central bridge portion. The lower edges of the lenses are left rimless. However, if desired the rims can be extended to the lower edges of the lenses as well, either partially or completely.

Figure 2:
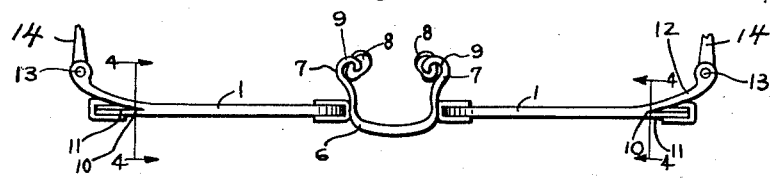
Fig. 2 is a top view of Fig. 1.
Figure 3:
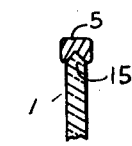
Fig. 3 is a cross section on line 3—3 of Fig. 1.
Figure 4:
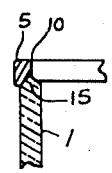
Fig. 4 is a cross section on line 4—4 of Fig. 2.
Figure 5:
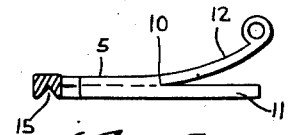
Fig. 5 is a partial top view of the lens rims adjacent the temple side thereof.

The central bridge portion of the mounting as shown in Figs. 1 and 2 comprises the nose spanning portion 6, guard arms 7 extending rearwardly and carrying the nose guards 8. The nose guards 7 are provided with loops or bends 9. These arms are pliable and bendable so the nose guards may be positioned on the nose to required position by bending with pliers as is usual in the fitting practice in the art.

The lens straps 2 are secured to the lenses by lens screws or other usual prior art connections. These straps 2 may comprise either a single ear engaging one face of the lens, or an ear engaging each face of the lens.

In order to remove strains from the temple side lens connections imposed through the leverage exerted thereon by the long pivoted temples where the temple connection is adjacent the temple side lens connection, the rims 5 are split or divided at the points 10, one branch 11 extending to the temple side lens connection, and the other branch 12 is fashioned and shaped into a temple connecting arm, which is pliable and bendable for adjustment. The branch 12 extends rearwardly and outwardly and terminates in a pivoted temple connection 13 to which the temples 14 are pivotally connected.

The rim 5 is preferably made with an internal lens groove 15. The rim preferably is formed by rolling metal stock to a desired shape, the lens groove 15 being formed simultaneously in the rim as the metal stock is shaped during said rolling process. The rim portions are then cut or split at the points 10, adjacent the temple side portion of the lenses. This cut or split can be made by cutting through the rim into the lens groove on the top of the rim intermediate its sides, leaving a portion overlying the top of the rim as shown in Figs. 2–4 and 5 and designated as 11, and the branch 12 portion bent out rearwardly and fashioned into the temple connection at 13, or the rim may be cut or soldered on the rear side of the rim, so the top of the lens will be entirely covered by the section 11. The portion of the lens from the point of cutting at 10 to the temple side lens connection on its rear side below the top of the lens will be uncovered by any portion of the rim. The top edge of the lenses at these portions will be exposed. Using this construction and following this process permits of the production of the rim and the temple supporting arm from the one single grooved lens rim, as contrasted with making the lens rim of a portion having a lens groove therein and the temple arm portion with a separate branch extending rearward of the grooved rimmed portion.

This results in a simplified construction that is lighter in weight and easier and more economical to produce. The construction is also more efficient than one in which the temple arm is soldered to the edge of the rim because the elasticity and springiness of the rim is maintained. Where soldering is used, the temper of the metal is liable to be destroyed and the springiness and elasticity of the temple arm greatly reduced or destroyed. With this construction the strains from the temples will be carried by the rims inwardly from the temple side lens connections, and will not come on the temple side lens connections themselves as it would if the temple was connected adjacent the temple side lens connections. Thus breakage of the lenses is reduced at the temple side lens connection.

The arm 12 being pliable and bendable allows adjustment of the width between temples and also upwardly and downwardly.

The cutting or splitting of the lens rims provides a simple and economical way of obtaining the desired results, and the branch 12 being integral with the rim maintains the proper elasticity and spring in the temple arm and rim, which would be liable to be destroyed by the heat if the arm were separate and soldered to the rim.

With this cut or split rim construction, a neat and efficient ophthalmic mounting can be made, and the strains removed from the temple side lens connections all with the one single rim, in a simple and economical way without any increase in weight of the rims and without endangering the temper and spring of the temple arm connection through the heat of soldering operations.

From the foregoing it may be seen that all the objects and advantages of the invention have been obtained in a simple, efficient and economical way.

Having described my invention I claim:

1. A lens supporting structure for the lenses of an ophthalmic mounting comprising a bridge having long and slender metallic bar-like members extending outwardly of the opposed sides thereof and shaped substantially to follow the upper contour shape of the lenses when assembled therewith, and lens connection means located adjacent each of the opposed sides of the bridge, said bar-like members each having a channelled portion extending longitudinally thereof and shaped to receive the upper edge portion of a respective lens and each terminating adjacent the temporal end thereof in a section divided inwardly along its length to form two separate integrally related adjustable portions, said channelled portion and integrally related adjustable portions being formed from a unitary bar of metal, and with the line of division between said adjustable portions communicating with the channel and being of a length less than half the distance between the vertical center lines of the respective lens and the temporal edge thereof and each terminating in perforated connection means, one of which is adapted to be connected with the lens adjacent the temporal edge thereof and the other being connectable to a temple for aiding in supporting the structure on the face, said adjustable portion having the perforated means adjacent the end thereof for connection with the lens being shaped to follow the adjacent edge portion of the lens as a continuation of the shape of the main portion of the bar-like member, and the other of said adjustable portions being resilient in nature and shaped to curve outwardly and rearwardly from adjacent the base of said line of division therebetween, and lying in a plane above the plane of the perforated means for connection with the lens, and said supporting structure having nose pad supporting arms with nose pads connected thereto extending rearwardly of the opposed sides of said bridge.

2. An ophthalmic mounting of the character described comprising a pair of lenses, an intermediate bridge, a pair of long and slender metallic bar-like members extending outwardly of the opposed sides thereof and shaped substantially to the upper contour shape of the respective lens with which it is assembled, and lens connection means on the opposed sides of said bridge, said bar-like members each having a channelled portion extending longitudinally thereof to receive the upper edge portion of a respective lens and each terminating adjacent the temporal end thereof in a section divided inwardly along its length to form two separate integrally related adjustable portions, said channelled portion and integrally related adjustable portion being formed from a unitary bar of metal, with the line of division between said adjustable portions communicating with the channel and each being of a length less than half the distance between the vertical center line of the respective lens and the temporal edge thereof and each terminating in perforated connection means, one of which is adapted to be connected with said lens adjacent the temporal edge thereof and the other being connected to a temple for supporting the structure on the face, said portion having the perforated means adjacent the end thereof for connection with the lens being shaped to follow the adjacent edge portion of said lens as a continuation of the shape of the major portion of the bar-like member, and the other of said adjustable portions being resilient in nature and shaped to curve outwardly and rearwardly from the base of said line of division therebetween and lying in a plane disposed above the plane of the perforated lens connection means adjacent the end of the other adjustable portion of said divided temporal end section.

HARRY H. STYLL.

REFERENCES CITED

The following references are of record in the file of this patent:

UNITED STATES PATENTS

| Number | Name | Date |
| --- | --- | --- |
| 85,495 | Want et al. | Dec. 29, 1868 |
| 1,425,919 | Trembly | Aug. 15, 1922 |
| 1,747,904 | Nerny | Feb. 18, 1930 |
| 2,151,668 | Vitolo | Mar. 21, 1939 |
| 2,198,852 | Williams | Apr. 30, 1940 |
| 2,214,377 | Markell | Sept. 10, 1940 |
| 2,245,594 | Kimmel | June 17, 1941 |
| 2,254,746 | Line | Sept. 2, 1941 |
| 2,255,149 | Brusell | Sept. 9, 1941 |
| 2,343,574 | Page | Mar. 7, 1944 |
| 2,384,815 | Cozzens | Sept. 18, 1945 |

FOREIGN PATENTS

| Number | Country | Date |
| --- | --- | --- |
| 213,639 | Switzerland | June 3, 1941 |